United States Patent [19]

Snavely

[11] 3,945,977

[45] Mar. 23, 1976

[54] HARD RUBBER COMPOSITIONS WITH HIGH EXTENDER OIL LEVELS

[75] Inventor: Kenneth E. Snavely, Bartlesville, Okla.

[73] Assignee: Phillips Petroleum Company, Bartlesville, Okla.

[22] Filed: Mar. 20, 1974

[21] Appl. No.: 453,182

[52] U.S. Cl................ 260/33.6 AQ; 260/880 B
[51] Int. Cl.².................................... C08K 5/01
[58] Field of Search ............ 260/33.6 AQ, 880 B

[56] References Cited
UNITED STATES PATENTS

| | | | |
|---|---|---|---|
| 2,975,160 | 3/1961 | Zelinski | 260/83.7 |
| 3,030,346 | 4/1962 | Cooper | 260/83.7 |
| 3,562,204 | 2/1971 | Van Breen | 260/880 B |
| 3,614,836 | 10/1971 | Snyder et al. | 260/880 B |
| 3,870,676 | 3/1975 | Condon | 260/33.6 AQ |

OTHER PUBLICATIONS

Morton — *Rubber Technology* (2nd ed.) (Van Nostrand) (N.Y.) (1973), pp. 515–533.

*Primary Examiner*—Donald E. Czaja
*Assistant Examiner*—H. H. Fletcher

[57] ABSTRACT

A vulcanizable composition is provided which comprises a butadiene-styrene A-B block copolymer having from 30 to 50 weight percent block polystyrene, 40 to 100 php of an extender oil and 20 to 100 php of carbon black.

8 Claims, No Drawings

HARD RUBBER COMPOSITIONS WITH HIGH EXTENDER OIL LEVELS

This invention relates to hard, vulcanizable compositions.

Mechanical rubber goods, otherwise known as hard rubber goods, are generally manufactured from the least expensive grade or rubber consistent with the intended use of the vulcanized product. In an effort to conserve rubber, manufacturers generally incorporate inexpensive fillers or extenders into the vulcanizable compositions. However, rubbers cannot be extended indefinitely; there exists some point at which the incorporation of further amounts of filler or extender into the vulcanizable compositions is no longer economically feasible. Such further amounts result in little or no additional gain in desired properties or in a disproportionate decrease in desired properties in the vulcanizate. It has been estimated, for example, that the rate of softening of rubber compounds by the addition of an extender oil is 1 point in Shore A hardness per the addition of about 2.1 parts oil per 100 parts of rubber.

It is an object of this invention to provide a vulcanizable composition characterized by a high extender oil level.

It is another object to provide a hard vulcanizate characterized by a high extender oil level.

Other objects, aspects and advantages of the invention will become apparent to those skilled in the art upon consideration of the accompanying disclosure.

In accordance with the present invention there is provided a vulcanizable composition characterized by a high extender oil level which comprises: a butadiene-styrene block copolymer having the configuration A–B wherein A is an essentially homopolymer block of styrene and B is selected from the group consisting of an essentially homopolymer block of butadiene and a random copolymer block of butadiene and styrene, wherein the styrene content of the block copolymer is in the range of 30 to 75 weight percent, block A comprises 30 to 50 weight percent of the block copolymer and the molecular weight of the copolymer is in the approximate range of 50,000 to 700,000; from 40 to 100 php (parts by weight per 100 parts by weight of copolymer) of an extender oil; and from 20 to 100 php of carbon black.

In another embodiment of this invention there is provided a hard vulcanizate characterized by a high extender oil level which is prepared by vulcanizing the vulcanizable composition described above. The term "hard" is intended to cover materials having a Shore A hardness of at least about 60.

The present invention is predicated on the discovery that a vulcanizable composition comprising carbon black and particular block copolymers of butadiene and styrene can be extended using high levels of extender oils without disproportionate loss in Shore A hardness of the vulcanizate.

The block copolymers useful in the practice of this invention have the configuration A–B, as hereinbefore defined, and contain from 30 to 75 weight percent styrene, the remainder being 1,3-butadiene, wherein from 30 to 50 weight percent of the block copolymer is an essentially homopolymer block formed from styrene. Such copolymers can be prepared by processes such as are described in U.S. Pat. Nos. 2,975,160, 3,030,346 and 3,449,306, in which butadiene and styrene are contacted in a hydrocarbon solvent with an organolithium initiator such as n-butyllithium, in the presence or absence of polymerization modifiers, such as tetrahydrofuran. An essential for the success of this invention is that the A portion of the block copolymer be an essentially homopolymer block of styrene, as determined by the oxidative degradation method described in the *Journal of Polymer Science*, volume 1, page 429 (1946).

The extender oils which can be used in the compositions of the present invention include those commonly used petroleum oils which are compatible with natural or synthetic rubbers. These oils can be aromatic, aliphatic, naphthenic, or mixtures of these. They can be classified as staining or nonstaining and, generally, will have a viscosity in the range of 30-200 SUS at 210° F. Many such extender oils are known and commercially available, thus they need no further description.

The carbon blacks which can be used in the present invention include any carbon black having reinforcing properties when associated with synthetic or natural rubber. A large number of suitable carbon blacks are commercially available. Particularly suitable are furnace blacks having particle sizes in the range of 18 to about 60 millimicrons. Such carbon blacks are identified by the prefix numbers N1 through N7, according to the nomenclature system set forth in ASTM D-2516-66T.

The vulcanizable compositions of the present invention are compounded using conventional rubber compounding techniques and equipment. Any suitable procedure or apparatus, such as a roll mill or Banbury mixer, which will intimately mix the ingredients can be used. Mixing is carried out at a temperature for a time sufficient to intimately mix the ingredients without producing significant vulcanization. In general, mixing is done at a temperature higher than about 150° F. for a time in excess of one minute.

The compounding recipe for the vulcanizable compositions of the present invention will generally be as follows:

|  | Broad | Preferred |
|---|---|---|
| Copolymer | 100 parts by weight |  |
| Extender Oil | 40–100 php* | 50–90 |
| Carbon Black | 20–100 php | 40–75 |
| Vulcanizing Agent | 0.5–2.0 php | 0.75–1.75 |
| Other Additives | 1–20 php | 5–10 |

* parts per 100 copolymer, by weight

The vulcanizing agent is generally sulfur or a sulfur-containing compound. Other additives include accelerators, antioxidants, processing aids and the like.

The vulcanizable compositions of the present invention are vulcanized by conventional means. Mechanical rubber goods are formed using suitable forming means, such as injection molding, compression molding and the like, after which the formed compositions are heated at a temperature for a time sufficient to effect vulcanization of the composition. In general, vulcanization is carried out at a temperature in the approximate range of 250° to 450° F., for a time ranging from 0.01 to 1 hour.

The compositions of the present invention are useful in preparing brush bases, mats, bumpers, sanding pads, shoe soles and the like.

The following examples illustrate the invention.

EXAMPLE I

The copolymers used in the following examples were prepared by a solution polymerization process using sufficient n-butyllithium initiator to provide the desired molecular weight and varying amounts of tetrahydrofuran polymerization modifier to provide the desired level of polystyrene block. With one exception, copolymer E, the copolymers are linear. Copolymer E was coupled with tin tetrachloride at the completion of the polymerization period to produce a branched copolymer. The other copolymers were shortstopped with a fatty acid. Copolymer B was prepared as an oil masterbatch copolymer by incorporating 37.5 php of a naphthenic extender oil into the copolymer before recovery of the copolymer. A detailed description of these copolymers is shown in Table I below:

Table I

| | Copolymer Description Rubber | | | | |
|---|---|---|---|---|---|
| | A | B | C | D | E |
| Weight Percent: | | | | | |
| 1,3-Butadiene | 52 | 52 | 75 | 52 | 75 |
| Styrene | 48 | 48 | 25 | 48 | 25 |
| Block polystyrene | 34 | 33 | 17 | 10 | 0 |
| Mw × 10$^{-3}$* | 101 | 446 | 83 | 110 | 348 |
| Mooney, ML-4 at 212° F. | 49 | 39 | 52 | 48 | 59 |

*Weight average molecular weight

EXAMPLE II

Each of the copolymers A–E was compounded into sulfur-curable compositions according to the recipes shown in Table II below:

Table II

| Compounding Recipes (parts by weight) | | |
|---|---|---|
| | Composition | |
| | A,C,D,E | B |
| Copolymer | 100 | 137.5 |
| N330 carbon black | 50 | 70 |
| Extender oil[2] | various | |
| Zinc oxide | 3 | |
| Stearic acid | 2 | |
| Flexamine[1] | 1 | |
| Sulfur | 1 | |
| 2,2-Dibenzothiazyl disulfide | 0.6 | |
| 4,4-Dithiodimorpholine | 2.1 | |

[1] A physical mixture of a complex diarylamine-ketone reaction product (65%) and N,N′-diphenyl-p-phenylenediamine (35%).
[2] Highly aromatic commercial extender oil, 170 SUS at 210° F.

Blending and compounding of each composition were carried out in a conventional Banbury mixer at dump temperatures of about 300° F. at mixing times ranging from about 3 to about 8 minutes.

Test specimens were prepared from the above compositions by curing compression molded samples at 307° F. for 30 minutes. Shore A hardness tests were carried out on these specimens with results as shown in Table III below. Vulcanizate designations are the same as for the copolymer compounded therein.

Table III

| Vulcanizate | Block PS, % | Shore A Hardness | | | | Hardness Slope[3] |
|---|---|---|---|---|---|---|
| | | 10 phr total oil | 20 phr total oil | 40 phr total oil | 70 phr total oil | |
| A | 34 | 87 | — | 78.5 | — | 0.3 |
| B[4] | 33 | — | — | 84 | 74 | 0.3 |
| C | 17 | 73 | 67 | — | — | 0.6 |
| D | 10 | 76 | — | 54 | — | 0.7 |
| E | 0 | 59 | 53 | — | — | 0.6 |

[3] Slope is total change in hardness units divided by total change in oil level (e.g. for polymer A, 8.5 ÷ 30 = 0.3).
[4] For this oil masterbatch copolymer, the total oil includes 37.5 phr naphthenic extender oil initially present in addition to the highly aromatic oil added during compounding.

The above data illustrate that the presence of relatively large amounts of extender oil in vulcanizates A and B containing copolymers having at least 30 weight percent block polystyrene results in less loss in hardness with increasing extender oil level, i.e., lower hardness slope, than in vulcanizates C–E, which contain less than 30 weight percent block polystyrene. The values for hardness slope show that more extender oil can be added to a composition comprising a butadiene-styrene copolymer containing more than 30 weight percent block polystyrene for any given decrease in Shore A hardness than can be added to composition comprising such copolymers having less than 30 weight percent block polystyrene.

EXAMPLE III

Copolymers A, B and D were compounded in a manner similar to that of Example II according to the recipes given in Table IV below:

Table IV

| Compounding Recipes (parts by weight) | | |
|---|---|---|
| | Composition | |
| | A,D | B |
| Copolymer | 100 | 137.5 |
| N220 carbon black | — | 70 |
| N330 carbon black | 50 | — |
| Highly aromatic extender oil | various | |
| Zinc oxide | 3 | |
| Stearic acid | 2 | |
| Flexamine[1] | 1 | — |
| Diaryl-p-phenylenediamine | — | 1 |
| 6-Ethoxy-1,2-dihydro-2,2,4-trimethylquinoline | — | 2 |
| Paraffinic wax | — | 2 |
| Sulfur | 1 | |
| 2,2′-Dibenzothiazyl disulfide | 0.6 | |
| Dipentamethylenethiuram hexasulfide | 1.8 | |

[1] As given above.

Blending, compounding and preparation of the test specimens were carried out according to the procedure given in Example II. Results of the Shore A hardness tests are given in Table V below:

Table V

| Vulcan-izate | Block PS, % | Shore A Hardness Tests Hardness | | | | | | | | | Hardness Slope |
|---|---|---|---|---|---|---|---|---|---|---|---|
| | | Total Oil Level (phr) | | | | | | | | | |
| | | 10 | 20 | 30 | 40 | 50 | 60 | 70 | 80 | 90 | |
| A | 34 | — | — | — | 84 | 82 | — | — | — | — | 0.2 |
| B | 33 | — | — | — | 93 | 83 | 82 | 82 | 81 | 78 | 0.3 |
| D | 10 | 79 | 72 | 67 | 60 | — | | | | | 0.6 |

The above data obtained with still another compounding recipe, further illustrate vulcanizates prepared from block copolymers having block polystyrene contents of at least 30 percent show an unexpected tolerance for high oil level loading. That is, the decrease in hardness with increasing oil level (hardness slope) is relatively low for invention vulcanizates A and B in comparison to control vulcanizate D which was prepared from a similar copolymer having only 10 percent block polystyrene.

It will be evident to those skilled in the art that various modifications of this invention can be made, or followed, in the light of the foregoing disclosure and discussion, without departing from the scope or spirit thereof.

I claim:

1. A vulcanizable composition characterized by a high extender oil level comprising:
   a. a butadiene-styrene block copolymer having the configuration A–B wherein A is an essentially homopolymer block of styrene and B is selected from the group consisting of an essentially homopolymer block of butadiene and a random copolymer block of butadiene and styrene, wherein said block copolymer contains from 30 to 75 weight percent styrene, said block A comprises 30 to 50 weight percent of said block copolymer and the molecular weight of said block copolymer is in the approximate range of 50,000 to 700,000;
   b. from 40 to 100 parts by weight of an extender oil selected from the group consisting of aromatic oils, aliphatic oils, naphthenic oils and mixtures thereof, per 100 parts by weight of said block copolymer; and
   c. from 20 to 100 parts by weight of carbon black per 100 parts by weight of said block copolymer.

2. The composition of claim 1 wherein said extender oil is present in an amount ranging from 50 to 90 php and said carbon black is present in an amount ranging from 40 to 75 php.

3. The composition of claim 2 wherein said block copolymer contains 52 weight percent 1,3-butadiene, 48 weight percent styrene and has a polystyrene block content of 34 percent.

4. The composition of claim 2 wherein said block copolymer contains 52 weight percent 1,3-butadiene, 48 weight percent styrene and has a polystyrene block content of 33 percent.

5. The vulcanized composition of claim 1.

6. The vulcanizate of claim 5 wherein the Shore A hardness is greater than 60 and the decrease in hardness is not greater than 0.3 Shore A hardness units for each additional part of oil.

7. The vulcanizate of claim 6 wherein said block copolymer contains 52 weight percent 1,3-butadiene, 48 weight percent styrene and has a polystyrene block content of 34 percent.

8. The vulcanizate of claim 6 wherein said block copolymer contains 52 weight percent 1,3-butadiene, 48 weight percent styrene and has a polystyrene block content of 33 percent.

* * * * *